Jan. 22, 1963     E. L. VON ROSENBERG     3,074,767
WEAR-RESISTING DRILL PIPE COUPLING
Filed Dec. 2, 1959     2 Sheets-Sheet 1
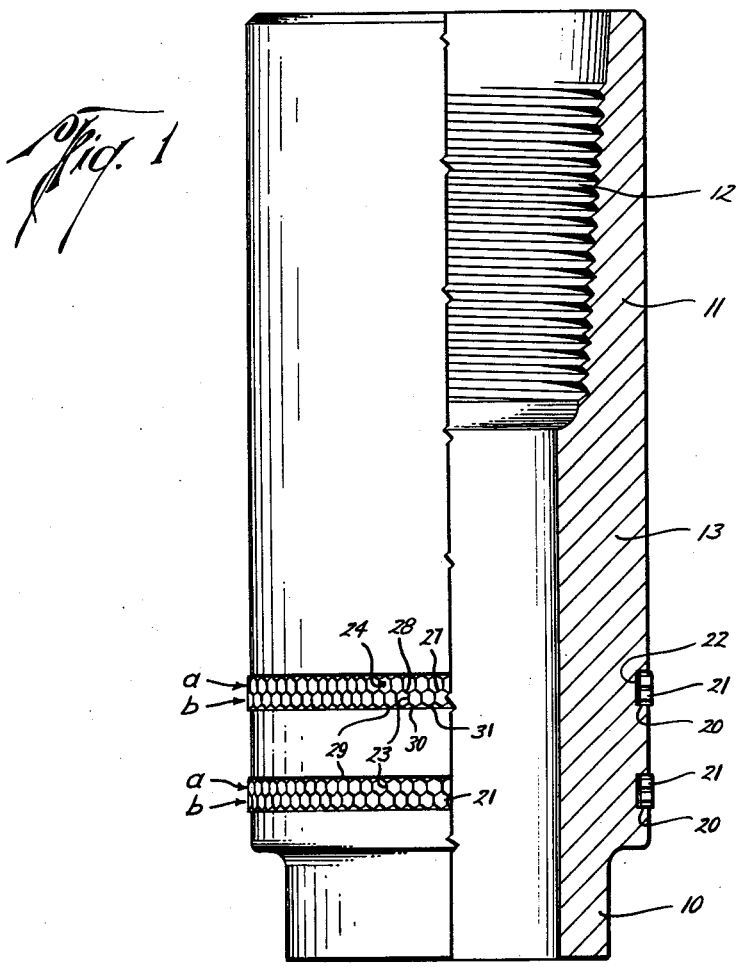
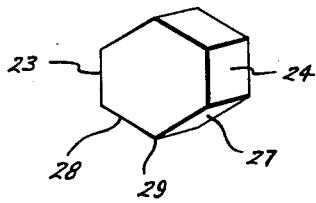
Edgar L. Von Rosenberg
INVENTOR.
BY
Murray Robinson
ATTORNEY Edgar L. Von Rosenberg
INVENTOR.

United States Patent Office 3,074,767
Patented Jan. 22, 1963

3,074,767
WEAR-RESISTING DRILL PIPE COUPLING
Edgar L. Von Rosenberg, Oklahoma City, Okla., assignor to American Iron & Machine Works Company, Inc., Oklahoma City, Okla., a corporation of Delaware
Filed Dec. 2, 1959, Ser. No. 856,835
12 Claims. (Cl. 308—4)

This application is a continuation-in-part of my application Serial No. 790,000, filed January 29, 1959 and now abandoned.

This invention pertains to tool joints and the like, e.g., drill collar connectors, drill pipe couplings, and other parts of a drill string of like maximum outer diameter adapted to contact the well wall as the drill string is rotated in the rotary method of drilling wells, e.g., drill collars. Such parts will hereinafter be generically termed drill pipe couplings.

Heretofore it has been the practice to protect drill pipe couplings with annular bands of particles of cast tungsten carbide welded in place, either on the surface of the coupling or in shallow grooves cut in the surface of the coupling. When the band of "hard facing," as such material is called, wears away it can be replaced one or more times before the tool joint must ultimately be discarded. A limitation on such replaceable hard facing bands has been the fact that only cast tungsten carbide can be used because the harder sintered tungsten carbide cannot easily be welded.

It is the principal object of the invention to provide a drill pipe coupling with replaceable bands of sintered tungsten carbide.

According to the invention thin hexagonal prism shaped tiles of sintered tungsten carbide are placed side by side on end (i.e. prism axis radial) in one or more annular grooves formed in the surface of a drill pipe coupling and held in place by silver solder. The tiles form a mosaic band. The mutual support provided by their engaged sides makes it possible to retain them in place on the coupling with such a material as silver solder without a true weld to the steel of the coupling.

The tungsten carbide separately preformed into tiles of a predetermined shape and fitted together to form a moasic in accordance with the invention are to be distinguished from the weld agglomerated masses of tungsten carbide particles which make up the hard facings heretofore employed. By separately preforming the tiles, that is, by forming them while separate from the coupling before attaching them to the coupling, the tungsten carbide particles making up the tiles can be unified by sintering or casting, rather than by the use of weld metal, thereby producing a much denser, harder overall material that is more wear resistant.

For a detailed description of preferred embodiments of the invention reference will now be made to the accompanying drawing wherein:

FIGURE 1 is a half section of a tool joint box embodying the invention;

FIGURE 2 is a perspective of a single tile of hard facing material as used in the invention.

Figure 3:
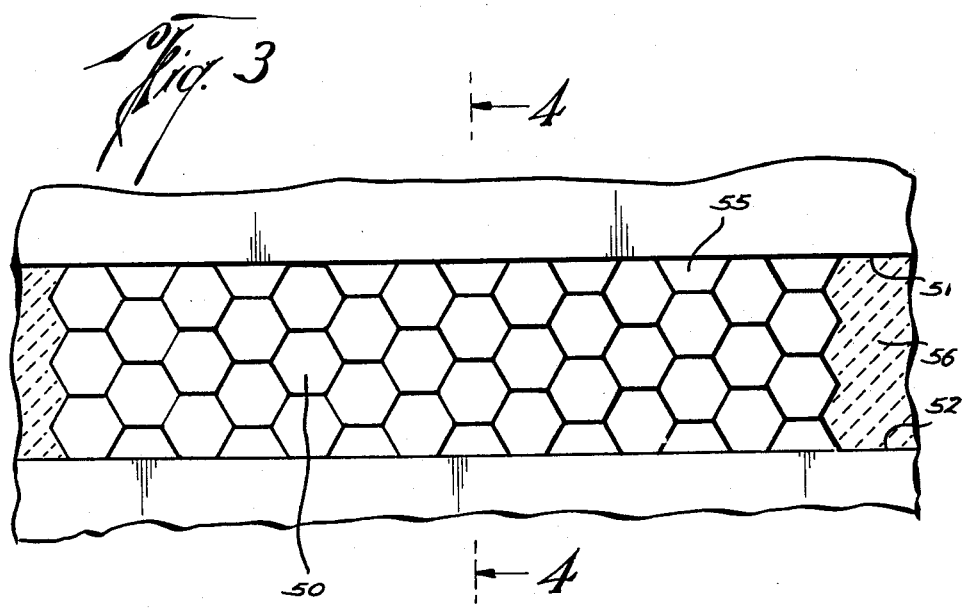
FIGURE 3 is a developed plan view of a portion of the surface of a tool joint embodying a modified form of the invention.

Referring now to FIGURE 1, there is shown a tool joint box comprising a tubular member having an end 10 adapted to be connected by flash welding to a drill pipe and having an end 11 internally threaded at 12 for connection to a correlative tool joint pin. The part 10 may be of the same outer and inner diameters as the drill pipe to which the joint is to be connected, whereas the body portion 13 is of larger outer diameter and much thicker.

Around the tool joint body are cut a plurality of annular grooves 20 of rectangular cross-section. In each groove is disposed a band of hard facing tiles 21 embedded in a matrix of silver solder 22. The matrix need not extend all the way to the top of the grooves, it being sufficient that the bottom end faces of the tiles be anchored therein. The outer end faces of the tiles are substantially flush with the outer peripherial surface of the body of the tool joint. As shown with some exageration in the drawing, a slight protrusion, e.g., .005 inch, may occur due to the thickness of the solder matrix in the groove in which the tiles are laid.

As best shown in FIGURE 2, each tile is a hexagonal prism having a height less than its maximum width so as to be wafer or disc shaped. For example tiles $\frac{1}{16}''$ or $\frac{1}{8}''$ thick may be used.

Referring again to FIGURE 1, the tiles are disposed with two opposite sides 23, 24 of each parallel to the tool joint box axis and adjacent the similarly disposed sides of two adjacent tiles. Within each groove 20 the tiles are disposed in a plurality of annular rows a, b, with the tiles in one row staggered relative to those in an adjacent row so as to allow the sides 27, 28 of the tiles in one row to lie adjacent to those in another row, thereby interlocking the rows. The corners 29 at the juncture of the sides 30, 31 of each tile that are not opposite another row of tiles are disposed so that the bisectors of the corner angles are perpendicular to the adjacent walls of the grooves 20 so that if the tiles are press fitted into the groove, they will not tend to turn and the corners will bite into the side walls of the groove.

While tiles of any preferably interlocking shapes may be used, it will be seen from the foregoing that hexagonal prism shaped tiles are especially well adapted to form the annular mosaic bands.

It is also to be understood that although the invention makes possible the use of sintered tungsten carbide for replaceable hard facing bands, tiles of cast tungsten carbide or other forms of hard facing material could be used and still retain certain advantages of the invention. Furthermore, although silver solder has been specified as preferable, other forms of hard solder or brazing could be used, and the tiles could even be welded in place, although in this instance special welding rods would be required for welding tiles of sintered tungsten carbide. If the tiles are welded in place, the grooves could be shallower or even omitted altogether.

In brief this invention contemplates the use of specially shaped parts of hard facing material that will be easier to secure to a drill pipe coupling by virtue of their shape and interlocking placement.

The invention has been described in connection with a tool joint box since it is not usually considered necessary to place protecting bands on the tool joint pin, for it is a wearing down of the tool joint box to the point where it will no longer grip a tool joint pin tight enough to be secure that is the usual criterion for replacing a tool joint. Also, it is felt that the bands on the box will protect the adjacent pin. However the bands could also be placed on the tool joint pin if desired.

Only two rows a, b of tiles have been shown in each groove, since this insures that each tile contacts a side wall of the groove 20 and is thus retained by the tool joint itself rather than solely by contact with other tiles and the matrix in the bottom of the groove. However more than two rows in one groove could be used in some cases, especially if the tiles are welded in place.

Figure 4:
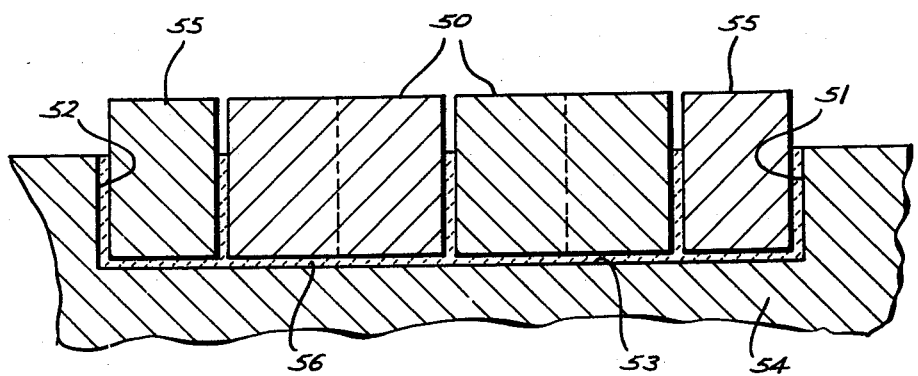
FIGURE 4 is a section to an enlarged scale taken on line 4—4 of FIGURE 3.

FIGURES 3 and 4 show a form of the invention wherein the tiles are placed with two sides parallel to the sides 51, 52 of the groove 53 in the tool joint 54. Half hexagonal cross-section tiles 55 are used as well as full hexagonal cross-section tiles 50 so that the resulting mosaic completely fills the groove 54. The added side support provided by this arrangement gives such strength that press-fitting is unnecessary, the silver solder 56 or other matrix in which the tiles are embedded being sufficient by itself to retain the tiles. Although the sides of each tile will be closely adjacent to one another and to the sides of the groove 54, thin portions of the matrix 55 will usually be disposed therebetween, as shown in FIGURE 4, although there will in some cases be actual contact between the sides. The same is true of the bottoms of the tiles and the grooves. This construction is well suited for use where more than two rows of tiles are desired, e.g., 3 rows as shown in FIGURES 3 and 4.

While preferred embodiments of the invention have been shown and described, many modifications thereof could be made by one skilled in the art without departing from the spirit of the invention and it is desired to protect by Letters Patent all forms of the invention falling within the scope of the following claims.

I claim:

1. A drill pipe coupling having a band of hard facing therearound, said band comprising a plurality of annular rows of separately preformed interlocking tiles of hard facing material, said tiles being disposed in an annular groove formed in said coupling and embedded in a matrix of solder.

2. A drill pipe coupling having a band of hard facing therearound, said band comprising a plurality of annular rows of separately preformed interlocking tiles of hard facing material, said tiles being disposed in an annular groove formed in said coupling and embedded in a matrix of solder, there being but two of said rows in said groove, said tiles each having a corner engaging a side wall of said groove.

3. A drill pipe coupling having a band of hard facing therearound, said band comprising a plurality of annular rows of separately preformed interlocking tiles of hard facing material, said tiles being disposed in an annular groove formed in said coupling and embedded in a matrix of solder, there being but two of said rows in said groove, said tiles each having a corner engaging a side wall of said groove, said tiles each being of hexagonal prism shape with two opposing sides parallel to the axis of the coupling and with two other sides between the first two said sides being disposed adjacent two other sides of tiles in an adjacent row of tiles.

4. A drill pipe coupling having a band of hard facing therearound, said band comprising a plurality of annular rows of separately preformed interlocking tiles of hard facing material, said tiles being disposed in an annular groove formed in said coupling and embedded in a matrix of solder, there being but two of said rows in said groove, said tiles each having a corner engaging a side wall of said groove, said tiles each being of hexagonal prism shape with two opposing sides parallel to the axis of the coupling and with two other sides between the first two said sides being disposed adjacent two other sides of tiles in an adjacent row of tiles, each of said tiles being composed of sintered tungsten carbide, said matrix being of silver solder.

5. A drill pipe coupling having a band of hard facing therearound, said band comprising a plurality of annular rows of separately preformed interlocking tiles of hard facing material, said tiles being disposed in an annular groove formed in said coupling and embedded in a matrix of solder, there being but two of said rows in said groove, said tiles each having a corner engaging a side wall of said groove, said tiles each being of hexagonal prism shape with two opposing sides parallel to the axis of the coupling and with two other sides between the first two said sides being disposed adjacent two other sides of tiles in an adjacent row of tiles, each of said tiles being composed of sintered tungsten carbide, said matrix being of silver solder, the thickness of said tiles being less than the maximum width thereof, said tiles protruding only slightly beyond the top of said groove.

6. A drill pipe coupling having a band of hard facing therearound, said band comprising a plurality of annular rows of separately preformed interlocking tiles of hard facing material, said tiles being disposed in an annular groove formed in said coupling and embedded in a matrix of solder, the tiles filling the groove and those tiles adjacent the sides of the groove each having a flat side parallel to the adjacent side of the groove.

7. A drill pipe coupling having a band of hard facing therearound, said band comprising a plurality of annular rows of separately preformed interlocking tiles of hard facing material, said tiles being disposed in an annular groove formed in said coupling and embedded in a matrix of solder, some of said tiles being of hexagonal cross section disposed with two sides of each tile parallel to the sides of the groove and adjacent the side of a like tile or the groove and each of the other sides of each tile being disposed adjacent the side of another tile so as to fill the groove except for half hexagon cross section spaces adjacent the sides of the groove, the remainder of said tiles being of half hexagon cross section shape and filling said half hexagon cross section spaces.

8. A drill pipe coupling having a band of hard facing therearound, said band comprising a plurality of annular rows of separately preformed interlocking tiles of hard facing material, said tiles being formed of sintered tungsten carbide and supported by a metallic bonding material within an annular groove formed in said coupling.

9. Rotary equipment having a band of hard facing material extending around an annular area of its outer periphery, said band comprising a plurality of annular contiguous rows of separately preformed tiles of hard facing material, each of said tiles having the shape of a prism, i.e. a solid whose bases or ends are similar, equal and parallel polygons, the faces being plane parallelograms, said tiles being placed with their axes disposed radially to said annular area, the faces of each of said tiles being contiguous with adjacent faces of adjoining tiles in the same and adjoining rows, and shoulder means providing lateral support for said band against lateral displacement relative to said annular area.

10. The combination of claim 9 in which said tiles are made of sintered tungsten carbide.

11. The combination of claim 9 in which said shoulder means is provided by an annular groove within which is a metallic bonding material.

12. Rotary drilling equipment having a band of hard facing around an outer peripheral annular area thereof, said band comprising a plurality of contiguous interlocking annular rows of separately preformed sintered tungsten carbide tiles, said tiles being prism shaped, the side faces of said prisms being planes, said tiles being disposed with their prism axes perpendicular to said annular area, the ends of said tiles adjacent to said annular area being welded thereto.

References Cited in the file of this patent

UNITED STATES PATENTS

| | | |
|---|---|---|
| 1,637,317 | Shoemaker | July 26, 1927 |
| 2,137,138 | Graef | Nov. 15, 1938 |
| 2,334,350 | Neuhaus | Nov. 16, 1943 |
| 2,431,430 | Shaw | Nov. 25, 1947 |

FOREIGN PATENTS

| | | |
|---|---|---|
| 191,317 | Great Britain | Jan. 11, 1923 |